United States Patent
Morris

(10) Patent No.: US 10,370,765 B2
(45) Date of Patent: Aug. 6, 2019

(54) CORROSION INHIBITING SOL-GEL COMPOSITIONS

(71) Applicant: PRC-DeSoto International, Inc., Sylmar, CA (US)

(72) Inventor: Eric L. Morris, Murrieta, CA (US)

(73) Assignee: PRC-Desoto International, Inc., Sylmar, CA (US)

( * ) Notice: Subject to any disclaimer, the term of this patent is extended or adjusted under 35 U.S.C. 154(b) by 161 days.

(21) Appl. No.: 14/777,642

(22) PCT Filed: Mar. 13, 2014

(86) PCT No.: PCT/US2014/025936
§ 371 (c)(1),
(2) Date: Sep. 16, 2015

(87) PCT Pub. No.: WO2014/151533
PCT Pub. Date: Sep. 25, 2014

(65) Prior Publication Data
US 2016/0273111 A1    Sep. 22, 2016

Related U.S. Application Data

(60) Provisional application No. 61/802,606, filed on Mar. 16, 2013.

(51) Int. Cl.
*C23C 18/12* (2006.01)
*C23C 18/54* (2006.01)
*C09D 5/08* (2006.01)

(52) U.S. Cl.
CPC .......... *C23C 18/1254* (2013.01); *C09D 5/084* (2013.01); *C09D 5/086* (2013.01); *C23C 18/122* (2013.01); *C23C 18/54* (2013.01); *C23C 2222/20* (2013.01)

(58) Field of Classification Search
CPC ...................................................... C09D 5/084
See application file for complete search history.

(56) References Cited

U.S. PATENT DOCUMENTS

| | | | |
|---|---|---|---|
| 4,466,832 A * | 8/1984 | Yoshimura | C04B 24/40 106/626 |
| 6,478,886 B1 * | 11/2002 | Kunz | C09D 5/08 106/14.21 |
| 6,478,996 B1 | 11/2002 | Kunz et al. | |
| 7,232,479 B2 | 6/2007 | Poulet et al. | |
| 2004/0255819 A1 | 12/2004 | Sinko | |
| 2005/0031791 A1 * | 2/2005 | Sasaki | C09D 183/14 427/372.2 |
| 2010/0009177 A1 | 1/2010 | Venkataramani | |
| 2010/0266836 A1 | 10/2010 | Campazzi et al. | |
| 2012/0021232 A1 | 1/2012 | Hack et al. | |
| 2012/0059116 A1 | 3/2012 | Sepeur et al. | |
| 2012/0085261 A1 | 4/2012 | Barbe et al. | |

FOREIGN PATENT DOCUMENTS

| | | |
|---|---|---|
| EP | 1832629 A1 | 9/2007 |
| WO | 2009069111 A2 | 6/2009 |
| WO | 2014140846 A2 | 9/2014 |

* cited by examiner

*Primary Examiner* — Kuo Liang Peng
(74) *Attorney, Agent, or Firm* — Alicia M. Passerin, Esq.

(57) ABSTRACT

A composition for application to a metal substrate comprises a sol-gel or a silane and a corrosion inhibitor. The corrosion inhibitor comprises a lithium ion and/or an azole compound. A coated substrate includes the composition for application to a metal substrate and a coating on the composition. A method of fabricating a coated substrate comprises applying the composition to a substrate, curing the composition to form a conversion coating, and applying a coating on the conversion coating.

18 Claims, No Drawings

CORROSION INHIBITING SOL-GEL COMPOSITIONS

CROSS-REFERENCE TO RELATED APPLICATION(S)

This application claims priority to and the benefit of U.S. Provisional Application Ser. No. 61/802,606, filed on Mar. 16, 2013 in the United States Patent and Trademark Office, the entire contents of which are incorporated herein by reference.

BACKGROUND

Metals such as aluminum and their alloys have many uses in aerospace, commercial, and private industries. However, these metals have a propensity to corrode rapidly in the presence of water due to their low oxidation-reduction (redox) potential, thus significantly limiting the useful life of objects made from these metals, and/or increasing maintenance costs. These metals also may have a problem with paint adhesion, as the surface of the metal, when formed into an object, is generally very smooth.

The oxidation and degradation of metals used in aerospace and auto, commercial, and private industries is a serious and costly problem. To prevent or minimize the oxidation and degradation of metals, corrosion resistant coatings are applied to the metal's surface. Some coatings may also improve adhesion by using a sol-gel film between the metal and the upper layers of coating. Coatings providing corrosion resistance to metal substrates, while providing the necessary adhesion are therefore desired.

SUMMARY

According to embodiments of the present invention, a composition for application to a metal substrate includes a sol-gel, and a corrosion inhibitor comprising a lithium ion and/or an azole compound.

In some embodiments, for example, a composition for application to a metal substrate includes a corrosion inhibitor comprising a lithium ion and/or an azole compound, and a silane.

In other embodiments, a composition for application to a metal substrate includes a coating composition containing a sol-gel or a silane, and a corrosion inhibitor comprising a lithium ion and/or an azole compound.

DETAILED DESCRIPTION

According to embodiments of the present invention, a corrosion resistant coating composition for coating a metal surface (also referred to herein as a metal substrate) includes a sol-gel or other silane containing coating composition, and includes a lithium ion and/or an azole compound. The corrosion resistant coating composition may further include additional Group IA metal ions. The sol-gel based composition or the silane containing coating composition having the lithium ion and/or the azole compound, as described herein, may minimize or overcome problems associated with known sol-gel and silane based coating compositions, especially for higher strength Al alloys, such as Aluminum 2024, which is known to have poor corrosion resistance. Further, the sol-gel and silane based coating compositions according to embodiments of the invention can achieve suitable adhesion with subsequently applied paints and primers.

As used herein, the following terms have the following meanings.

The term "substrate," as used here, refers to a material having a surface. In reference to applying a conversion coating, the term "substrate" refers to a metal substrate such as aluminum, iron, copper, zinc, nickel, magnesium, and/or an alloy of any of these metals including but not limited to steel. Some exemplary substrates include aluminum and aluminum alloys. Additional exemplary substrates include high copper aluminum substrates (i.e., substrates including an alloy containing both aluminum and copper in which the amount of copper in the alloy is high, for example, an amount of copper in the alloy of 3 to 4%).

The term "coating," and like terms, when used as a verb herein, refers to the process of applying a composition, i.e., contacting a substrate with a composition, such as contacting a substrate with a conversion coating, primer, and/or topcoat. The term "coating" may be used interchangeably with the terms "application/applying," "treatment/treating" or "pretreatment/pretreating", and may also be used to indicate various forms of application or treatment, such as painting, spraying and dipping, where a substrate is contacted with a composition by such application means. All or part of the substrate can be contacted. That is, the compositions of the present invention can be applied to at least a portion of a substrate.

The term "conversion coating," also referred to herein as a "conversion treatment" or "pretreatment" refers to a treatment for a metal substrate that causes the chemistry of the metal surface to be converted to a different surface chemistry. The terms "conversion treatment" and "conversion coating" also refer to the application or treatment of a metal surface in which a metal substrate is contacted with an aqueous solution having a metal of a different element than the metal contained in the substrate. Additionally, the terms "conversion coating" and "conversion treatment" refer to an aqueous solution having a metal element in contact with a metal substrate of a different element, in which the surface of the substrate partially dissolves in the aqueous solution, leading to the precipitation of a coating on the metal substrate (optionally using an external driving force to deposit the coating on the metal substrate).

The term "Group IA metal ion," or "Group 1 metal ion" as used herein, refers to an ion or ions of elements from the first column of the periodic table (with the exception of H). The group of elements identified by Group IA or Group 1 (with the exception of H) is also known as the alkali metals, and includes, for example, Li, Na, K, Rb, Cs, and Fr.

The term "sol-gel," as used herein, refers to a colloidal solution (sol) that acts as the precursor for an integrated network (or gel) of either discrete particles or a network of a 1, 2, or 3-dimensional polymeric matrix. Typical precursors include metal alkoxides and metal salts, which undergo various forms of hydrolysis and polycondensation reactions. In an exemplary species, metal compounds condense (peptize) in solution to form a hybrid organic/inorganic polymer. Depending on reaction conditions, the polymers may condense to colloidal particles or they may grow to form a network gel. The ratio of organics to inorganics in the polymer matrix may be controlled to adjust performance for a particular application.

As used in this disclosure, the term "comprise" and variations of the term, such as "comprising" and "comprises," are not intended to exclude other additives, components, integers ingredients or steps.

All amounts disclosed herein are given in weight percent of the total weight of the composition at 25° C. and one atmosphere pressure, unless otherwise indicated.

According to some embodiments of the invention, the composition for application to a metal substrate comprises a sol-gel and a corrosion inhibitor comprising a lithium ion and/or an azole compound. The corrosion inhibitor may further include additional Group IA (or Group 1) metal ions.

In some embodiments, the sol-gel may be an organosilane based sol-gel. Suitable organosilane based solgels may include such compounds as allyltrimethoxysilane, n-(2-aminoethyl)-3-aminopropyltrimethoxysilane, p-aminophenylsilane, 3-aminopropyltriethoxysilane, 3-aminopropyltrimethoxysilane, glycidyloxy-(C2-C6 alkyl) trialkoxysilanes, including 3-glycidoxypropyldiisopropylethoxysilane, 3-glycidoxypropylmethyldiethoxysilane, and 3-glycidoxypropyltrimethoxysilane, 3-mercaptopropyltriethoxysilane, 3-mercaptopropyltrimethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, vinyltrimethoxysilane, and mixtures thereof. For example, in some embodiments, the sol-gel may comprise a 3-glycidoxypropyltrimethoxysilane and also comprise an organometallic compound, for example an alkoxyzirconium salt. Further descriptions of suitable sol-gels may be found, for example, in U.S. Pat. No. 6,579,472 (at, for example, column 2, line 62 through column 7, line 65); U.S. Pat. No. 7,153,898 (at, for example, column 2, line 28 through column 19, line 17); and U.S. Pat. No. 7,141,306 (at, for example, column 3, line 51 through column 8, line 23), the contents of the cited portions of which are incorporated herein by reference.

In some embodiments, the organosilane comprises an organometallic compound, for example, an alkoxy metallic compound, such as, for example an alkoxy zirconium compound. Nonlimiting examples of suitable zirconium compounds include compounds having the general formula $Zr(OR)_4$ where each R is independently a lower aliphatic carbon group, or a branched aliphatic, alicyclic, or aryl group. As used herein, the term "lower aliphatic carbon group" refers to an aliphatic carbon group having 1 to 6 carbon atoms. Some nonlimiting examples of suitable organometallic compounds, including alkoxy metallic compounds, include aluminum triethoxide, aluminum isopropoxide, aluminum sec-butoxide, aluminum tri-t-butoxide, magnesium trifluoroacetylacetonate, magnesium methoxide, magnesium ethoxide, titanium methoxide, titanium ethoxide, titanium isopropoxide, titanium propoxide, titanium butoxide, titanium ethylhexoxide, titanium(triethanolaminato)isopropoxide, titanium bis(ethyl acetoacetato)diisopropoxide, titanium bis(2,4-pentanedionate)diisopropoxide, zirconium ethoxide, zirconium isopropoxide, zirconium propoxide, zirconium sec-butoxide, zirconium t-butoxide, aluminum di-s-butoxide ethylacetonate, calcium methoxyethoxide, calcium methoxide, magnesium methoxyethoxide, copper ethoxide, copper methoxyethoxyethoxide, antimony butoxide, bismuth pentoxide, chromium isopropoxide, tin ethoxide, zinc methoxyethoxide, titanium n-nonyloxide, vanadium tri-n-propoxide oxide, vanadium triisobutoxide oxide, iron ethoxide, tungsten ethoxide, samarium isopropoxide, lanthanum methoxyethoxide, and combinations thereof.

Nonlimiting examples of suitable sol-gels according to embodiments of the present invention include stabilized alkoxyzirconium organometallic salts, such as Zr n-propoxide, and organosilane coupling agents, such as 3-glycidoxypropyltrimethoxysilane (GTMS). Some nonlimiting examples of commercially available sol-gels includes those sold under the name DesoGel™, available from PRC-DeSoto International, Inc. of Sylmar, Calif.

The composition according to embodiments of the present invention may further include a corrosion inhibitor. The corrosion inhibitor incudes a lithium ion, and/or an azole compound. In some embodiments, the corrosion inhibitor may include additional Group IA (or Group 1) metal ions, such as, for example, Na, K, Rb, Cs, Fr, or a combination thereof, in addition to the Li ion.

In some embodiments, the sol-gel based coating composition or other silane containing coating composition may include a lithium ion, and a counter ion, which may include various ions known to form salts with lithium. Nonlimiting examples of counter ions suitable for forming a salt with lithium include carbonates, hydroxides and silicates (e.g., orthosilicates and metasilicates). In some embodiments, for example, the corrosion inhibitor includes a lithium carbonate salt, a lithium hydroxide salt, or a lithium silicate salt (e.g., a lithium orthosilicate salt or a lithium metasilicate salt). Additionally, the counter ion may include various ions known to form salts with the other Group IA (or Group 1) metals (e.g., Na, K, Rb, Cs and/or Fr). Nonlimiting examples of counter ions suitable for forming a salt with the alkali metals include carbonates, hydroxides and silicates (e.g., orthosilicates and metasilicates). In some embodiments, for example, the corrosion inhibitor includes an alkali metal carbonate salt, an alkali metal hydroxide salt, and/or an alkali metal silicate salt (e.g. an alkali metal orthosilicate salt or an alkali metal metasilicate salt). For example, some nonlimiting examples of suitable salts for inclusion in the corrosion inhibitor include carbonates, hydroxides and silicates (e.g., orthosilicates or metasilicates) of sodium, potassium, rubidium, cesium, and francium.

In some embodiments, the lithium ion is present in the composition in an amount of 0.02 g/1000 g sol-gel solution to 12 g/1000 g sol-gel solution, for example 1 g/1000 g sol-gel solution to 5 g/1000 g sol-gel solution.

The sol-gel or silane based coating compositions according to embodiments of the invention may be substantially chromate free. As used herein, the term "substantially" is used as a term of approximation, and not as a term of degree, and is intended to account for the inherent deviations in measured or calculated values that would be recognized by those of ordinary skill in the art. Additionally, the term "substantially chromate free" is used as a term of approximation to denote that the amount of chromate in the composition is negligible, such that if chromate is present in the composition at all, it is as an incidental impurity.

The composition may also contain other components and additives such as, but not limited to, carbonates, surfactants, chelators, thickeners, allantoin, polyvinylpyrrolidone, halides, and/or adhesion promoters.

The sol-gels or silane based coating compositions according to embodiments of the present invention may be produced as either water-based or solvent-based mixtures (e.g., alcohol-based mixtures). Previous water-based systems have alleviated flammability, safety, toxicity, and environmental concerns associated with solvent-based systems (e.g., alcohol-based systems), but solvent-based systems (e.g., alcohol-based systems) allow better control of the amount of hydrolysis of the sol.

In some embodiments, the pH of the sol-gel or silane based coating composition may be above 10, and the temperature range of the composition, when applied to a substrate, may be 15° C. to 120° C. For example, the lithium based coating composition may be applied to a metal substrate at room temperature, for example, 15° C. to 25° C.

According to some embodiments, the corrosion inhibitor in the sol-gel or silane based composition may comprise an azole compound. Examples of suitable azole compounds include cyclic compounds having, 1 nitrogen atom, such as pyrroles, 2 or more nitrogen atoms, such as pyrazoles, imidazoles, triazoles, tetrazoles and pentazoles, 1 nitrogen atom and 1 oxygen atom, such as oxazoles and isoxazoles, and 1 nitrogen atom and 1 sulfur atom, such as thiazoles and isothiazoles. Nonlimiting examples of suitable azole compounds include 2,5-dimercapto-1,3,4-thiadiazole (CAS: 1072-71-5), 1H-benzotriazole (CAS: 95-14-7), 1H-1,2,3-triazole (CAS: 288-36-8), 2-amino-5-mercapto-1,3,4-thiadiazole (CAS: 2349-67-9), also named 5-amino-1,3,4-thiadiazole-2-thiol, 2-amino-1,3,4-thiadiazole CAS: 4005-51-0), and combinations thereof. In some embodiments, for example, the azole may be 2,5-dimercapto-1,3,4-thiadiazole. In some embodiments, the azole may be present in the composition at a concentration of 0.01 g/L of sol-gel composition to 1 g/L of sol-gel composition, for example, 0.4 g/L of sol-gel composition. In some embodiments, the azole compound includes benzotriazole and/or 2,5-dimercapto-1,3,4-thiadiazole.

In some embodiments, for example, the sol-gel or silane based composition may have a combination of corrosion inhibitors, including both an azole compound and a lithium ion. Additionally, these sol-gel or silane based compositions may further include additional Group IA (or Group 1, i.e., the alkali metals) metal ions, such as, for example, Na, K, Rb, Cs and/or Fr.

In some embodiments, the composition may also contain an indicator compound, so named because they indicate, for example, the presence of a chemical species, such as a metal ion, the pH of a composition, and the like. An "indicator", "indicator compound", and like terms as used herein refer to a compound that changes color in response to some external stimulus, parameter, or condition, such as the presence of a metal ion, or in response to a specific pH or range of pHs.

The indicator compound used according to certain embodiments of the present invention can be any indicator known in the art that indicates the presence of a species, a particular pH, and the like. For example, a suitable indicator may be one that changes color after forming a metal ion complex with a particular metal ion. The metal ion indicator is generally a highly conjugated organic compound. A "conjugated compound" as used herein, and as will be understood by those skilled in the art, refers to a compound having two double bonds separated by a single bond, for example two carbon-carbon double bonds with a single carbon-carbon bond between them. Any conjugated compound can be used according to the present invention.

Similarly, the indicator compound can be one in which the color changes upon change of the pH; for example, the compound may be one color at an acidic or neutral pH and change color in an alkaline pH, or vice versa. Such indicators are well known and widely commercially available. An indicator that "changes color when exposed to an alkaline pH" therefore has a first color (or is colorless) when exposed to an acidic or neutral pH and changes to a second color (or goes from colorless to colored) when exposed to an alkaline pH. Similarly, an indicator that "changes color when exposed to an acidic pH" goes from a first color/colorless to a second color/colored when the pH changes from alkaline/neutral to acidic.

Nonlimiting examples of such indicator compounds include methyl orange, xylenol orange, catechol violet, bromophenol blue, green and purple, eriochrome black T, Celestine blue, hematoxylin, calmagite, gallocyanine, and combinations thereof. According to some embodiments, the indicator compound comprises an organic indicator compound that is a metal ion indicator. Nonlimiting examples of indicator compounds include those found in Table I. Fluorescent indicators, which will emit light in certain conditions, can also be used according to the present invention, although in certain embodiments the use of a fluorescent indicator is specifically excluded. That is, in certain embodiments, conjugated compounds that exhibit fluorescence are specifically excluded. As used herein, "fluorescent indicator" and like terms refers to compounds, molecules, pigments, and/or dyes that will fluoresce or otherwise exhibit color upon exposure to ultraviolet or visible light. To "fluoresce" will be understood as emitting light following absorption of light or other electromagnetic radiation. Examples of such indicators, often referred to as "tags", include acridine, anthraquinone, coumarin, diphenylmethane, diphenylnaphthlymethane, quinoline, stilbene, triphenylmethane, anthracine and/or molecules containing any of these moieties and/or derivatives of any of these such as rhodamines, phenanthridines, oxazines, fluorones, cyanines and/or acridines.

TABLE I

| Compound | Structure | CAS Reg. No. |
|---|---|---|
| Catechol Violet Synonyms: Catecholsulfonphthalein; Pyrocatecholsulfonephthalein; Pyrocatechol Violet | | 115-41-3 |

TABLE I-continued

| Compound | Structure | CAS Reg. No. |
|---|---|---|
| Xylenol Orange<br>Synonym:<br>3,3'-Bis[N,N-bis(carboxymethyl)aminomethyl]-o-cresolsulfonephthalein tetrasodium salt | 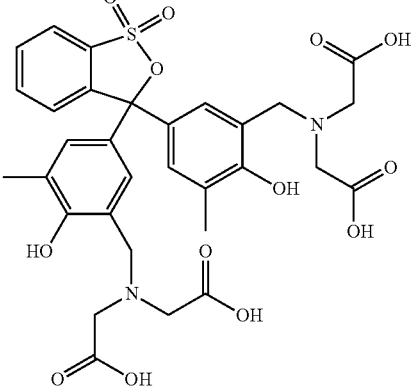 | 3618-43-7 |

According to a one embodiment, the conjugated compound comprises catechol violet, as shown in Table I. Catechol violet (CV) is a sulfone phthalein dye made from condensing two moles of pyrocatechol with one mole of o-sulfobenzoic acid anhydride. It has been found that CV has indicator properties and when incorporated into corrosion resistant compositions having metal ions, it forms complexes, making it useful as a chelometric reagent. As the composition containing the CV chelates metal ions, a generally blue to blue-violet color is observed.

According to another embodiment, xylenol orange, as shown in Table I is employed in the compositions according to embodiments of the present invention. It has been found that xylenol orange has metal ion indicator properties and when incorporated into corrosion resistant compositions having metal ions, it forms complexes, making it useful as a chelometric reagent. As the composition containing the xylenol orange chelates metal ions, a solution of xylenol orange turns from red to a generally blue color.

The indicator compound may be present in the composition in an amount of from 0.01 g/1000 g solution to 3 g/1000 g solution, such as 0.05 g/1000 g solution to 0.3 g/1000 g solution.

In some embodiments of the present invention, the conjugated compound, if it changes color in response to a certain external stimulus, provides a benefit when using the current compositions, in that it can serve as a visual indication that a substrate has been treated with the composition. For example, a composition comprising an indicator that changes color when exposed to a metal ion that is present in the substrate will change color upon complexing with metal ions in that substrate; this allows the user to see that the substrate has been contacted with the composition. Similar benefits can be realized by depositing an alkaline or acid layer on a substrate and contacting the substrate with a composition of the present invention that changes color when exposed to an alkaline or acidic pH.

In addition, the use of certain conjugated compounds according to the present invention can provide the substrate with improved adhesion to subsequently applied coating layers. This is particularly true if the conjugated compound has hydroxyl functionality. Accordingly, some embodiments of the present compositions allow for deposition of subsequent coating layers onto a substrate treated according to the present invention without the need for a primer layer. Such coating layers can include urethane coatings and epoxy coatings.

According to other embodiments of the invention, a substrate comprises a metal surface coated at least in part with any of the compositions described above. For example, in some embodiments, the substrate comprises an aluminum or aluminum alloy surface coated with the sol-gel or silane containing composition including a corrosion inhibitor comprising a lithium ion. The corrosion inhibitor may further include additional Group IA (or Group 1, i.e., the alkali metals) metal ions, and/or an azole compound.

The sol-gel or silane based composition according to the invention may be applied to the metal substrate, optionally followed by coating with a primer coat, and/or a topcoat.

According to still other embodiments, the metal substrate may be pre-treated prior to contacting the metal substrate with the sol-gel or silane based coating compositions described above. As used herein, the term "pre-treating" refers to the surface modification of the substrate prior to subsequent processing. Such surface modification can include various operations, including, but not limited to cleaning (to remove impurities and/or dirt from the surface), deoxidizing, and/or application of a solution or coating, as is known in the art. Pretreatment may have one or more benefits, such as the generation of a more uniform starting metal surface, improved adhesion to a subsequent coating on the pre-treated substrate, and/or modification of the starting surface in such a way as to facilitate the deposition of a subsequent conversion coating.

According to some embodiments, the metal substrate may be prepared by first solvent treating the metal substrate prior to contacting the metal substrate with the sol gel or silane containing coating composition. As used herein, the term "solvent treating" refers to rinsing, wiping, spraying, or immersing the substrate in a solvent that assists in the removal of inks, oils, etc. that may be on the metal surface. Alternately, the metal substrate may be prepared by degreasing the metal substrate using conventional degreasing methods prior to contacting the metal substrate with sol-gel or silane containing coating composition.

The metal substrate may be pre-treated by solvent treating the metal substrate. Then, the metal substrate may be pre-treated by cleaning the metal substrate with an alkaline cleaner prior to application of the sol-gel or silane containing coating composition. One example of a suitable pre-cleaner is a basic (alkaline) pretreatment cleaner. The pre-cleaner may also include a corrosion inhibitor, some of which may "seed" the surface of the metal substrate during the cleaning process with the corrosion inhibitor to minimize metal surface attack, and/or facilitate the subsequent conversion coating. Other suitable, but nonlimiting, pre cleaners include degreasers and deoxidizers, such as Turco 4215-NCLT, available from Telford Industries, Kewdale, Western Australia, Arnchem 7/17 deoxidizers, available from Henkel Technologies, Madison Heights, Mich., and phosphoric acid-based deoxidizers, available from PRC-DeSoto International, Inc., Sylmar, Calif.

In some embodiments, the metal substrate may be pre-treated by mechanically deoxidizing the metal prior to placing the sol-gel or silane containing coating composition on the metal substrate. A nonlimiting example of a typical mechanical deoxidizer is uniform roughening of the surface using a Scotch-Brite pad, or similar device.

According to some embodiments, the metal substrate may be pre-treated by solvent wiping the metal prior to applying the sol-gel or silane containing coating composition to the metal substrate. Nonlimiting examples of suitable solvents include methyl ethyl ketone (MEK), methyl propyl ketone (MPK), acetone, and the like.

Additional optional steps for preparing the metal substrate include the use of a surface brightener, such as an acid pickle or light acid etch, a smut remover, as well as immersion in an alkaline solution.

The metal substrate may be rinsed with either tap water, or distilled/deionized water between each of the pretreatment steps, and may be rinsed well with distilled/deionized water and/or alcohol after contact with the sol-gel or silane containing coating composition.

Once the metal substrate has been appropriately pre-treated, if desired, the sol-gel or silane containing coating composition may then be allowed to come in contact with at least a portion of the surface of the metal substrate. The metal substrate may be contacted with the sol-gel or silane containing coating composition using any conventional technique, such as dip immersion, spraying, or spreading using a brush, roller, or the like. With regard to application via spraying, conventional (automatic or manual) spray techniques and equipment used for air spraying may be used. In other embodiments, the coating can be an electrolytic-coating system or the coating can be applied in paste or gel form. The sol-gel or silane containing coating composition may be applied to any suitable thickness, depending on the application requirements. In some embodiments, the sol-gel or silane containing coating may be applied using a touch-up pen. Techniques for applying a sol-gel that are applicable to the sol-gel compositions according to embodiments of the present invention are known in the art.

When the metal substrate is coated by immersion, the immersion times may vary from a few seconds to multiple hours based upon the nature and thickness of the desired sol-gel or silane containing coating composition. Dwell times range from a few seconds to multiple hours. In some embodiments, dwell times are less than 30 minutes, for example three minutes or less.

When the metal substrate is coated using a spray or manual swabbing application, the sol-gel or silane containing coating composition solution is brought into contact with at least a portion of the substrate using conventional spray application methods. The dwell time in which the solgel or silane containing coating composition solution remains in contact with the metal substrate may vary based upon the nature and thickness of conversion coating desired. Dwell times range from a few seconds to multiple hours. In some embodiments, dwell times are less than 30 minutes, for example three minutes or less.

After contacting the metal substrate with the sol-gel or silane containing coating composition, the coated metal substrate may be air dried. A rinse step is not required.

According to some embodiments, the metal substrate may be first prepared by mechanical abrasion and then wet-wiped to remove smut. The substrate may then be air-dried prior to application. Next, the sol-gel or silane containing coating composition may be applied to a metal substrate for 1 to 10 minutes, for example, 7 minutes, keeping the surface wet by reapplying the coating composition as needed to keep the edges wet. Then, the sol-gel based coating composition is allowed to dry, for example in the absence of heat greater than room temperature, after the last application of the coating composition. The substrate need not be rinsed, and the metal substrate may then be further coated with primers and/or top coats to achieve a substrate with a finished coating.

According to other embodiments, a corrosion inhibiting admixture for addition to a sol-gel or silane containing coating composition comprises a corrosion inhibitor including a lithium ion and/or an azole compound, and a carrier. The sol-gel or silane containing composition may be prepared by first preparing a commercially available product, such as DesoGel and PreKote® (a non-chromated metal pretreatment available from Pantheon Enterprises, Inc., Phoenix, Ariz.) according to the manufacturer's instructions. The sol-gel or silane containing composition may be catalyzed and allowed to induce for 30 minutes, followed by addition of the corrosion inhibitor as described herein.

According to another embodiment, a kit for preparing a corrosion inhibiting sol-gel comprises an admixture for addition to a sol-gel or silane containing composition. The admixture comprises a corrosion inhibitor including a lithium ion and/or an azole compound, and optionally a carrier. The corrosion inhibitor may further include additional Group IA (or Group 1, i.e., the alkali metals) metal ions. The kit may further include instructions for preparing the corrosion inhibiting sol-gel. The admixture may either be pre-mixed with a carrier or else may include instructions for mixing with a carrier. The carrier may be, for example, water or an alcohol. The instructions may include directions for mixing and using the corrosion inhibitor with a commercially available sol-gel.

The following Examples are presented for illustrative purposes only, and do not limit the scope of embodiments of the present invention.

EXAMPLES

Example 1. Preparation of Sol-Gel Based Coating Compositions

The following example and formulas demonstrate the general procedures for preparation of a sol-gel or silane containing coating composition according to embodiments of the present invention, metal substrate preparation, and application of the coating composition to the metal substrate. However, other formulations and modifications to the following procedures can be used according to embodiments of the present invention, as will be understood by those of ordinary skill in the art with reference to this disclosure.

A. Composition Formulations.

According to one embodiment, the composition comprises a sol-gel based composition having a sol-gel, and a corrosion inhibitor comprising a lithium salt or DMTZ, and optionally an indicator compound (e.g., catechol violet). The sol-gel based coating compositions according to Candidates 1-4 were prepared with the amounts of ingredients shown in Table II below. Candidate 4 is a comparison example with no added corrosion inhibitor. The corrosion inhibitor solutions were prepared and added to the pre-mixed sol-gel as indicated in Table II. The base sol-gel mixture is stirred, for example, for 30 minutes or longer, to allow for proper dispersion of the solids within the water, alcohol, and acid mixture. After stirring the sol-gel mixture, the corrosion inhibitor solution was added to the base sol-gel and the resulting mixture was stirred. The sol-gel based composition with inhibitor compound was applied to the metal substrate within 1 hour.

TABLE II

Corrosion Inhibiting Sol-Gel Formulations

| Candidate | Sol-Gel | | | Corrosion Inhibitor | |
|---|---|---|---|---|---|
| 1 | PPG DesoGel | 504 g | $Li_2CO_3$ | 320 g Li solution (2.4 g dissolved in 317.6 g DI water) | |
| 2 | PPG DesoGel | 504 g | 2,5-Dimercanto-I,3,4-thiazole (DMTZ) | 320 g DMTZ solution (2.4 g. DMTZ dissolved in 317.6 g DI water); pH raised to 11 used NaOH, or $Li_2CO_3$ or LiOH | |
| 3 | PPG DesoGel | 504 g | $Li_2CO_3$ | 320 g Li solution (2.4 g dissolved in 317.6 g DI water) + catechol violet | |
| 4 (comparison) | PPG DesoGel | 504 g | — | — | |

B. Solution and Panel Testing.

The solutions of Candidates 1-4 were observed for color and stability, and the results are shown in Table III below. As can be seen from Table III, all of the solutions were stable (i.e., with not observed precipitation) 8 hours after mixing.

TABLE III

Stability After Mixing

| Candidate | Soln. Color | Stability (8 hrs) |
|---|---|---|
| 1 | Clear | Stable-No Ppt. |
| 2 | Orange | Stable-No Ppt. |
| 3 | Blue | Stable No Ppt. |
| 4 (comparison) | Clear | Stable-No Ppt. |

The panels prepared by applying the solutions of Candidates 1-4 on three different metal substrates (i.e., Bare Al 2014, Clad Al 2024, and Bare Al 7075) were analyzed for both dry and wet adhesion. To test for dry adhesion, a 45 degree crosshatch scribe pattern was cut through the cured coating to the base metal, Tape No. 250 (available from 3M Company) was applied and then removed in one continuous motion, and the tested area was examined for coating removal. The coated substrates were visually inspected and rated according to a scale of 0 to 10, where 0 corresponds to poor dry adhesion and 10 corresponds to good wet adhesion. The results are shown in Table IV below.]

To test for wet adhesion, the substrates were first cured and immersed in room temperature deionized water for 24 hours, then a 45 degree crosshatch scribe pattern was cut into the coating to the base metal, Tape No. 250 (available from 3M Company) was applied and then removed in one continuous motion, and the tested area was examined for coating removal. The coated substrates were visually inspected and rated according to a scale of 0 to 10, where 0 corresponds to poor wet adhesion and 10 corresponds to good wet adhesion.

In Table IV, the adhesion test results are reported as average dry adhesion/average wet adhesion (denoted avg dry/wet). As can be seen in Table IV, the presence of the corrosion inhibitor in the sol gel does not affect the adhesion properties of the system.

TABLE IV

Summary of Adhesion

| Candidate | Bare Al 2014 Avg Dry/Wet | Clad Al 2024 Avg Dry/Wet | Bare Al 7075 Avg Dry/Wet |
|---|---|---|---|
| 1 | 10/10 | 10/10 | 10/10 |
| 2 | 10/10 | 10/10 | 10/10 |
| 3 | 10/10 | 10/10 | 10/10 |
| 4 (comparison) | 10/10 | 10/10 | 10/10 |

The panels prepared by applying the solutions of Candidates 1-4 on three different metal substrates (i.e., Bare Al 2014, Clad Al 2024, and Bare Al 7075) were analyzed for corrosion resistance by subjecting them to a 72 hour neutral salt spray test according to ASTM B-117. The coated substrates were visually inspected and rated according to a scale of 0 to 10, where 0 corresponds to poor corrosion resistance and 10 corresponds to good corrosion resistance. The results of this test are shown in Table V below.

TABLE V

Summary of 72 Hour Neutral Salt Spray Test

| Candidate | Bare Al 2014 | Clad Al 2024 | Bare Al 7075 |
|---|---|---|---|
| 1 | 7 | 8 | 9 |
| 2 | 8 | 9 | 9 |
| 3 | 1 | 10 | 1 |
| 4 (comparison) | 1 | 9 | 1 |

Whereas particular embodiments of the present disclosure have been described above for purposes of illustration, it will be understood by those of ordinary skill in the art that numerous variations of the details of the present disclosure may be made without departing from the invention as defined in the appended claims, and equivalents thereof. For example, although embodiments herein have been described in connection with "a" lithium ion, "an" azole compound, and the like, one or more of these components or any of the other components recited can be used according to the present disclosure.

Although various embodiments of the present disclosure have been described in terms of "comprising" or "including," embodiments "consisting essentially of" or "consisting of" are also within the scope of the present disclosure. For example, while the present disclosure describes a composition including a sol-gel and a corrosion inhibitor including a lithium ion and/or an azole compound, a composition and/or a solution consisting essentially of or consisting of the sol-gel and the corrosion inhibitor is also within the scope of the present disclosure. Similarly, although a corrosion inhibitor comprising or including a lithium ion and/or an azole compound is described, corrosion inhibitors consisting essentially or consisting of a lithium ion and/or an azole compound are also within the scope of the disclosure. Thus, as described above, the composition may consist essentially of the sol-gel and the corrosion inhibitor, and the corrosion inhibitor may consist essentially of the lithium ion and/or the azole compound. In this context, "consisting essentially of" means that any additional components in the composition or corrosion inhibitor will not materially affect the corrosion resistance of a metal substrate coated with the composition. For example, a corrosion inhibitor consisting essentially of a lithium ion and/or an azole compound is free from other Group IA (or Group 1, i.e., the alkali metals) metal ions.

As used herein, unless otherwise expressly specified, all numbers such as those expressing values, ranges, amounts or percentages may be read as if prefaced by the word "about," even if the term does not expressly appear. Further, use of the word "about" reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure describes "an" azole compound, a mixture of such azole compounds can be used. When ranges are given, any endpoints of those ranges and/or numbers within those ranges can be combined within the scope of the present disclosure. The terms "including" and like terms mean "including but not limited to." Similarly, as used herein, the terms "on," "applied on," and "formed on" mean on, applied on, or formed on, but not necessarily in contact with the surface. For example, a coating layer "formed on" a substrate does not preclude the presence of one or more other coating layers of the same or different composition located between the formed coating layer and the substrate.

Notwithstanding that the numerical ranges and parameters set forth herein may be approximations, numerical values set forth in the specific examples are reported as precisely as is practical. Any numerical value, however, inherently contains certain errors necessarily resulting from the standard variation found in their respective testing measurements. The word "comprising" and variations thereof as used in this description and in the claims do not limit the disclosure to exclude any variants or additions.

What is claimed is:

1. A composition for application to a metal substrate, the composition comprising:
    a sol-gel; and
    a corrosion inhibitor comprising a lithium ion present in an amount of 0.02 g/1000 g composition to 12 g/1000 g composition and an alkali metal ion other than lithium.

2. The composition according to claim 1, wherein the corrosion inhibitor further comprises a counter ion capable of forming a salt with the lithium ion, the alkali metal ion other than lithium, or combinations thereof.

3. The composition according to claim 2, wherein the counter ion comprises a carbonate ion and/or a hydroxide ion.

4. The composition according to claim 1, wherein the sol-gel comprises an organosilane based sol-gel.

5. The composition according to claim 4, wherein the organosilane based sol-gel comprises allyltrimethoxysilane, n-(2-aminoethyl)-3-aminopropyltrimethoxysilane, p-aminophenylsilane, 3-aminopropyltriethoxysilane, 3-aminopropyltrimethoxysilane, 3-glycidoxypropyldiisopropylethoxysilane, 3-glycidoxypropylmethyldiethoxysilane, glycidyloxy-(C2-C6 alkyl)trialkoxysilanes comprising 3-glycidoxypropyltrimethoxysilane, 3-mercaptopropyltriethoxysilane, 3-mercaptopropyltrimethoxysilane, 3-methacryloxypropy lmethyldiethoxy silane, 3-methacryloxypropylmethyldimethoxysilane, 3-methacryloxypropyltrimethoxysilane, n phenylaminopropyltrimethoxysilane, vinylmethyldiethoxysilane, vinyltriethoxysilane, vinyltrimethoxysilane, or a mixture thereof.

6. The composition according to claim 4, wherein the organosilane based sol-gel comprises a glycidyloxy-(C2-C6 alkyl)trialkoxysilane.

7. The composition according to claim 4, wherein the organosilane based sol-gel comprises 3-glycidoxypropyltrimethoxysilane.

8. The composition according to claim 1, wherein the sol-gel comprises an organometallic compound.

9. The composition according to claim 8, wherein the organometallic compound comprises an alkoxyzirconium compound.

10. The composition according to claim 1, further comprising an azole compound.

11. The composition according to claim 10, wherein the azole compound comprises 2,5-dimercapto-1,3,4-thiadiazole.

12. A coated article, comprising:
    a substrate; and
    the composition of claim 1 on at least a portion of the substrate.

13. The coated article of claim 12, wherein the substrate comprises aluminum.

14. The coated article of claim 12, further comprising a coating on the composition.

15. A method of manufacturing a coated article, the method comprising:
    applying the composition of claim 1 to at least a portion of a substrate; and
    curing the composition to form a sol-gel coating.

16. The method of claim 15, further comprising pre-treating the substrate prior to application of the composition.

17. The method of claim 15, further comprising applying a coating on at least a portion of the sol-gel coating.

18. A composition for application to a metal substrate, the composition comprising:
- a corrosion inhibitor comprising a lithium ion present in an amount of 0.02 g/1000 g composition to 12 g/1000 g composition, an alkali metal ion other than lithium, and a counter ion capable of forming a salt with the lithium ion, the alkali metal ion other than lithium, or combinations thereof, wherein the counter ion comprises a carbonate ion and/or a hydroxide ion; and
- a silane.

* * * * *